United States Patent [19]
Contractor et al.

[11] Patent Number: 6,107,238
[45] Date of Patent: Aug. 22, 2000

[54] PROCESS FOR MANUFACTURE AND USE OF IMPROVED ATTRITION RESISTANT CATALYST

[75] Inventors: Rashmikant Maganlal Contractor, Willmington; William Joseph Letts, Wilmington, both of Del.

[73] Assignee: E. I. du Pont de Nemours and Company, Wilmington, Del.

[21] Appl. No.: 09/163,680

[22] Filed: Sep. 30, 1998

[51] Int. Cl.[7] .............................. B01J 21/08; B01J 23/22; B01J 23/28; B01J 2/08
[52] U.S. Cl. .............................. 502/247; 502/8; 502/248; 502/255; 502/305; 502/353; 502/504
[58] Field of Search ................. 502/8, 209, 255, 502/247, 305, 353, 248, 504

[56] References Cited

U.S. PATENT DOCUMENTS

| | | | |
|---|---|---|---|
| 3,746,657 | 7/1973 | Miller et al. | 252/437 |
| 4,127,591 | 11/1978 | Kamimura et al. | 549/260 |
| 4,317,778 | 3/1982 | Blum et al. | 260/346.75 |
| 4,351,773 | 9/1982 | Milberger et al. | 549/259 |
| 4,612,298 | 9/1986 | Hettinger et al. | 502/65 |
| 4,621,072 | 11/1986 | Arntz et al. | 502/504 |
| 4,677,084 | 6/1987 | Bergna | 502/8 |
| 4,769,477 | 9/1988 | Bergna | 549/259 |
| 5,128,114 | 7/1992 | Schwartz | 423/335 |
| 5,302,566 | 4/1994 | Schwartz | 502/8 |

FOREIGN PATENT DOCUMENTS

| | | |
|---|---|---|
| 0112 956 | 7/1984 | European Pat. Off. . |
| 0123293 | 10/1984 | European Pat. Off. . |
| 9-315813 | 12/1997 | Japan ................................. 502/232 |
| 2118060 | 10/1983 | United Kingdom . |
| WO 89/01362 | 2/1989 | WIPO . |

OTHER PUBLICATIONS

P. Mars et al., Oxidations Carried Out By Means Of Vanadium Oxide Catalysts, *Chemical Engineering Science*, vol. 8, pp. 41–59, 1954 (no month).

(Kawasaki Steel Corp.) Abstract 1995 JP 03 229636.

*Primary Examiner*—Ngoc-Yen Nguyen

[57] ABSTRACT

A method for manufacturing of an improved attrition resistant catalyst having an oxide-rich surface layer involving forming a slurry comprising; catalyst, catalyst precursor or catalyst support particles (e.g., transition metal oxides), a colloidal oxide sol (e.g., colloidal silica), and a solution of a solvent and solute wherein the solute consist essentially of a precursor of said oxide-rich surface with particle size no greater than 5 nm (e.g., aqueous silicic acid or polysilicic acid) and then spray drying the slurry to form porous microspheres of attrition resistant catalyst; and, calcining the spray dried microspheres. Such a catalyst is particularly useful in oxidation processes wherein the oxidation is performed by an oxidized form of the catalyst and the resulting reduced form of the catalyst is separately regenerated (e.g., two-step vapor phase processes carried out in recirculating solids reactors, transport bed reactors or circulating fluidized bed reactors and the like).

6 Claims, No Drawings

PROCESS FOR MANUFACTURE AND USE OF IMPROVED ATTRITION RESISTANT CATALYST

BACKGROUND OF THE INVENTION

1. Field of the Invention

This invention relates to the use of an improved attrition resistant catalyst in oxidation processes wherein the oxidation is performed by an oxidized catalyst and the reduced catalyst is separately regenerated, and wherein the attrition resistant catalyst is made by the steps of forming a slurry containing a material with catalytic properties, spray drying the slurry, and calcining the spray dried product.

2. Description of the Related Art

Preparation of attrition resistant catalysts containing a binder ingredient is known in the art. In one method, the catalyst is made by the steps of forming a slurry containing a material with catalytic properties, spray drying the slurry, and calcining and activating the resulting spray dried microspheres. The binder ingredient is any inert support or binder such as silica, alumina or aluminum silicate. Besides spray drying, other techniques are known for preparing attrition resistant catalysts such as impregnation of the catalyst or its precursor on porous spherical support particles.

In particular, certain prior art procedures have involved combining a silica component in the form of a solution or colloidal sol, generally at a concentration of $SiO_2$ above 10 wt % to as high as 50 wt %, with a catalyst, catalyst precursor, or catalyst support to form a slurry. The slurry is then spray dried, calcined and activated to form the catalyst. The silica component, which functions as a binder, is normally dispersed throughout the particles.

U.S. Pat. No. 4,677,084 to Bergna discloses an improvement in the process of preparing attrition resistant catalysts, in which a solution of oxide precursor is used to form an oxide shell over particles of catalyst, catalyst precursor or catalyst support. The process includes the steps of forming a slurry of the catalyst, catalyst precursor or catalyst support particles with a solute of the oxide precursor having a particle size of not greater than 5 nm, spray drying, and calcining. The amount of solute and particles are selected such that the oxide shell which forms is comprised of 3 to 15% by weight of the total weight of particles and oxide. Aqueous silicic acid, i.e. polysilicic acid, with a $SiO_2$ concentration below 6 wt % is preferred as the oxide precursor. Examples show that satisfactory attrition resistance is achieved with much lower $SiO_2$ content in the dried catalyst than prior art catalysts.

The attrition resistance of the above catalyst has proven to be excellent in typical vapor phase catalytic processes where the catalyst is used in a single valence state, that is, where the catalyst is continually regenerated in the reaction vessel by the incoming reactants and is essentially unchanged by the reaction.

However, in certain vapor phase catalytic oxidation processes it is advantageous to instead carry out the reaction in two steps, in the first of which the oxidized form of a catalyst is used to oxidize the reactant, and in the second of which the reduced catalyst from the first step is separately regenerated. Such two-step vapor phase processes can be conveniently carried out in recirculating solids reactors, also referred to in the literature as transport bed reactors or circulating fluidized bed reactors, as well as by other names. The literature discloses such processes have been found advantageous for the oxidation of butane to maleic anhydride, the oxidation of propane to acrolein and acrylic acid, the ammoxidation of propylene to acrylonitrile, and various other applications. When used in this type of process, we have found that the attrition resistance of the catalyst made by the Bergna patent can be inadequate in certain cases, although adequate in other cases.

A variation of the catalyst preparation used in the Bergna patent is disclosed in U.S. Pat. No. 5,302,566 to Schwartz, aimed at increasing the stability against gelling of the freshly made polysilicic acid used in the above process. This patent discloses a modified process in which the gelling problem is corrected by adding to the catalyst/polysilicic acid slurry a colloidal oxide sol having oxide particles averaging in size between 5 and 7 nm, wherein the amount of colloidal oxide sol provides between 50% to 95% by weight of the oxide shell and the polysilicic acid provides 50% to 5%, and wherein the oxide shell is between 3% and 15% by weight of the total weight of catalyst particles and shell. Under the conditions tested, as shown in the patent's FIG. 1, this modified catalyst was equal or slightly inferior in attrition resistance to the Bergna patent catalyst. It was not tested in the previously described type of two-stage oxidation system.

There is a need for a catalyst with improved attrition resistance for certain two-step oxidation processes wherein the oxidation is performed by an oxidized catalyst and the reduced catalyst is separately regenerated.

BRIEF SUMMARY OF THE INVENTION

This invention relates to vapor phase oxidation processes in which the oxidation is performed by an oxidized catalyst and the reduced catalyst is separately regenerated, and wherein an improved attrition resistant catalyst for these processes has an oxide-rich surface layer. According to the present invention the improved attrition resistant catalyst having an oxide-rich surface layer is made by a process comprising the steps of:

a) forming a slurry comprising;
   i) catalyst, catalyst precursor or catalyst support particles,
   ii) a colloidal oxide sol wherein oxide particles in the sol having an average size between 10 and 100 nm; and,
   iii) a solution of a solvent and solute wherein the solute consist essentially of a precursor of said oxide-rich surface with particle size no greater than 5 nm; and wherein 25% to 50% of the total dry catalyst weight is from the colloidal oxide sol (ii), 5% to 15% of the total dry catalyst weight is from the soluble oxide precursor (iii), and the remainder is from the catalyst, catalyst precursor or catalyst support particles (i);

b) spray drying the slurry from step (a) to form porous microspheres of attrition resistant catalyst; and, c) calcining the spray dried microspheres of step (b) at an elevated temperature which is below the temperature which is substantially deleterious to the catalyst, catalyst precursor or catalyst support particles.

The preferred solvent for oxide precursor (c) is water, the preferred oxide is $SiO_2$, and the preferred solute is silicic acid, a precursor to anhydrous silica.

The process for uses of such preferred embodiment involves an improved vapor phase oxidation wherein the oxidation is performed by an oxidized catalyst and the resulting reduced catalyst is separately regenerated, wherein an attrition resistant catalyst for the process has an oxide-rich surface layer and is made by a process comprising the steps of:

a) forming a slurry comprising;
  i) catalyst, catalyst precursor or catalyst support particles,
  ii) a colloidal oxide sol wherein oxide particles in the sol having an average size between 10 and 100 nm; and,
  iii) an aqueous silicic acid solution wherein the concentration of silicic acid calculated as equivalent $SiO_2$ does not exceed 6 wt %; and wherein 25% to 50% of the total dry catalyst weight is from the colloidal oxide sol (ii), 5% to 15% of the total dry catalyst weight is from the silicic acid solution (iii), and the remainder is from the catalyst, catalyst precursor or catalyst support particles (i);
b) spray drying the slurry from step (a) to form porous microspheres of attrition resistant catalyst; and,
c) calcining the spray dried microspheres of step (b) at an elevated temperature which is below the temperature which is substantially deleterious to the catalyst, catalyst precursor or catalyst support particles.

DETAILED DESCRIPTION OF THE INVENTION

The vapor phase oxidation processes for which this invention is applicable are those wherein the oxidation is performed by an oxidized catalyst and wherein the reduced catalyst is separately regenerated. These catalytic oxidation processes are preferably carried out in a recirculating solids reactor system. In this application we will use the term "recirculating solids reactor system" to mean a general reaction system with two reaction zones, in which two separate reactions take place, and which uses a particulate solid which circulates between the two reaction zones and takes part in both reactions.

Optionally, either or both reaction zones may take place in a transport bed reactor or a fluidized bed reactor. In this application we will use the term "transport bed reactor" to mean any reactor in which catalyst particles are injected at one end of the reactor and carried along with gas reactants at high velocities and discharged at the other end of the reactor to a gas-solids separation vessel, whereas in a fluidized bed reactor the catalyst typically recirculates within the reactor for an extended period of time. A riser reactor, in which the reactor is a vertical pipe wherein the catalyst and gases are fed in at the bottom, transported in essentially plug flow and removed at the top, is one example of a transport bed reactor. Another example is a pipeline reactor, in which the flow of catalyst and gases is other than vertically upwards. A transport bed reactor, as defined herein, includes a riser reactor or pipeline reactor which also incorporates a zone for fast fluidization, i.e., a zone where the gas velocities are sufficiently high to carry out a substantial portion of the catalyst fed, but with more backmixing of catalyst than would occur in plug flow.

Typically, the reduced catalyst from the riser zone is then separated from the product gas and stripped of any carbonaceous species. The reduced catalyst is then regenerated (i.e., reoxidized) in a separate step to enable its reuse for the first step. Typically the catalyst is regenerated in a fluidized bed regeneration zone.

This two-step process permits independent control of the reactant gas concentrations, the gas residence time, and the catalyst residence time in each zone for optimum operation, and enables several advantages of the above reactive concept over the single-step fixed bed or fluidized bed alternative. High selectivity is achieved because of plug flow and optimum oxidative state of the catalyst. Significant reductions are realized in product recovery costs because the regeneration off-gas stream is kept separate from the product gas stream, resulting in a highly concentrated product stream. High throughput rates are attributed to the independent control of variables for the two steps of the operation, resulting in reduced investment and decreased catalyst inventory.

However, in some cases the attrition loss for the circulating catalyst is unacceptably high when two-step vapor phase catalytic oxidation processes are carried out in a recirculating solids reactor system. Although we do not wish to be bound by the following theory, we attribute this problem to a volume shrinkage which may occur with catalyst valence change. For example if a vanadium catalyst is used in such a process, the vanadium will theoretically be in the form of $V_2O_5$ in one step and $V_2O_4$ in the other, the latter occupying a smaller molecular volume. This volume shrinkage can affect the mechanical strength of the catalyst and its attrition resistance. In a commercial process, the actual valence change will typically be less than the theoretical, and may for example vary between 4.0 and 4.6 in the reduction and oxidation stages in some processes and only between 4.0 and 4.05 in others. We believe this difference may explain why the volume shrinkage is a problem in some two-step processes and not in others.

This volume shrinkage, when it is significant in amount, not only weakens the catalyst structure but may cause catalyst particles to become dislodged from the support and to escape from the reactor as attrited fines, leaving behind a catalyst support containing a decreased amount of vanadium oxide.

In our tests we have found that catalysts made by the Bergna patent process and used in certain two-step vapor phase oxidation processes have excellent attrition resistance when the catalyst is in its oxidized form, but that the attrition losses increase by an order of magnitude when these catalysts are tested in their reduced state. We attribute this to the previously described volume shrinkage and resultant weakening due to loss of a portion of its interior shell support. That is, although the silica shell continues to provide excellent abrasion resistance to the catalyst, its impact resistance becomes poor in the absence of adequate interior shell support.

We theorized that, if we provide a rigid structural support to the shell by a skeleton of a suitable inert material inside the shell, the catalyst can expand and shrink during the oxidation and reduction cycles and yet maintain its attrition resistance. This theory was tested using a colloidal silica with particles averaging between 10 and 100 nm in addition to the freshly prepared polysilicic acid used in the Bergna catalyst process. This procedure differs from that in U.S. Pat. No. 5,302,566, in which 5 to 7 nm colloidal silica is used, and wherein the colloidal silica is used to replace more than half of the polysilicic acid in the oxide shell of the comparable Bergna catalyst.

The process of this invention provides an improved attrition resistant catalyst for the described two-step vapor phase oxidation processes. The catalyst has an oxide-rich surface layer and is made by a process comprising:
  a) forming a slurry comprising;
    i) catalyst, catalyst precursor or catalyst support particles,
    ii) a colloidal oxide sol wherein oxide particles in the sol having an average size between 10 and 100 nm; and,
    iii) a solution of a solvent and solute wherein the solute consist essentially of a precursor of said oxide-rich surface with particle size no greater than 5 nm; and wherein 25% to 50% of the total dry catalyst weight is from the colloidal oxide sol (ii), 5% to 15% of the total dry catalyst weight is from the soluble oxide precursor (iii), and the remainder is from the catalyst, catalyst precursor or catalyst support particles (i);

b) spray drying the slurry from step (a) to form porous microspheres of attrition resistant catalyst; and, c) calcining the spray dried microspheres of step (b) at an elevated temperature which is below the temperature which is substantially deleterious to the catalyst, catalyst precursor or catalyst support particles.

In a preferred embodiment, the improved attrition resistant catalyst of this invention for such two-step vapor phase oxidation processes is made by a process comprising:

a) forming a slurry comprising;
   i) catalyst, catalyst precursor or catalyst support particles,
   ii) a colloidal oxide sol wherein oxide particles in the sol having an average size between 10 and 100 nm; and,
   iii) an aqueous silicic acid solution wherein the concentration of silicic acid calculated as equivalent $SiO_2$ does not exceed 6 wt %; and wherein 25% to 50% of the total dry catalyst weight is from the colloidal oxide sol (ii), 5% to 15% of the total dry catalyst weight is from the silicic acid solution (iii), and the remainder is from the catalyst, catalyst precursor or catalyst support particles (i);

b) spray drying the slurry from step (a) to form porous microspheres of attrition resistant catalyst; and, c) calcining the spray dried microspheres of step (b) at an elevated temperature which is below the temperature which is substantially deleterious to the catalyst, catalyst precursor or catalyst support particles.

The catalyst or catalyst precursor is any oxidative catalyst active ingredient suitable for two-stage, vapor phase catalytic oxidation processes carried out in a recirculating solids reactor system, a transport bed reactor or fluidized bed reactor. The active ingredient in such catalysts or catalyst precursors is typically a transition metal oxide or mixed oxide or any other oxides or mixed oxides which operate according to the two-step process suggested by Mars and Van Krevelen in Chemical Engineering Science (Special Supplement) Vol.3, 1954, page 41. Of particular interest herein are vanadium, vanadium-phosphorus, multimetal molybdenum-vanadium and other vanadium-containing catalysts. For this reason, the following disclosure will focus on vanadium catalysts as representing a particularly preferred embodiment, but the invention is not limited thereto, and preparation of other catalysts used in two-stage, vapor phase catalytic oxidations also benefit from the process improvements disclosed herein.

Particles for the catalyst/catalyst precursor particles are reduced in size by micronization or similar size reduction process to a mean particle size of below about 3 microns, preferably below about 2 microns. We have found that attrition resistance is sometimes unsatisfactory when particles much larger than 3 microns are used.

The oxide precursor must be chosen so that it has no deleterious effect on the catalytic performance of the particular catalyst being used. The oxide can be inert or show catalytic activity for the particular process being run. When an attrition resistant catalyst is prepared, it is found that the peripheral oxide layer does not affect the behavior of the catalytically active phase during the calcination step, and the morphology of the microspheres is such that it allows the reactants access to the catalytically active phase. This oxide-rich surface layer has no deleterious effect on catalyst performance.

The solvent used in the slurry to be spray dried is a solvent for the oxide precursor. Water is preferred. The solute consists essentially of an oxide precursor of subcolloidal particle size. "Subcolloidal particle size" is defined herein as that of particles for which the largest dimension is no greater than 5 nm. The solute particles must not agglomerate, precipitate or gel during or following the formation of the solution or in contact with the catalyst, catalyst precursor or catalyst support particles. The solute particles must provide a sufficiently stable solution and slurry to permit spray drying. Because the solute particles with the above properties are much smaller than the voids between the catalyst, catalyst precursor or catalyst support, and are even appreciably smaller than the colloid oxide sol particles, when the slurry is spray dried the solute particles can flow with the solvent from the interior to the peripheral region of the porous microsphere formed by the evaporation of the solvent in a droplet of the spray. These solute particles then remain in this peripheral region as the drying is completed and form a hard peripheral shell.

The oxide for this shell can be chosen from the group comprising $SiO_2$, $Al_2O_3$, $P_2O_5$, $TiO_2$, $ZrO_2$, MgO, $Cr_2O_3$ and rare earth oxides. Examples of solutes for these oxides are silicic acid, basic aluminum chloride, phosphoric acid, titanyl oxychloride, hydrolyzed zirconyl nitrate, magnesium acetate, hydrolyzed basic chromium chloride and hydrolyzed basic nitrates of rare earths. The preferred oxide is $SiO_2$, and the preferred solute or oxide precursor is silicic acid, especially polysilicic acid.

The aqueous silicic acid solution that is useful in this invention contains silica of the proper particle size, i.e., no greater than 5 nm, and provides a solution of sufficient stability to allow the formation of the slurry and subsequent spray drying. The silicic acid can be in the form of a monomer or in the form of low molecular weight polymeric units. It is a very weak acid and exists only in dilute aqueous solutions. At greater concentrations, the monomer polymerizes to form dimer and higher molecular weight species of silicic acid.

The preferred form of silicic acid is polysilicic acid having a concentration of $SiO_2$ not exceeding about 6 wt % for adequate stability. Preparation of polysilicic acid from aqueous sodium silicate, and deionization of the solution using ion exchange resin, is described in previously referenced U.S. Pat. No. 4,677,084. The spray dried final product should contain at least 5% by weight of this material for adequate shell strength. Amounts exceeding 15% by weight are not necessary to impart adequate abrasion resistance to the spray dried particles. The preferred amount is about 10% by weight.

The colloidal oxide sol can be any commercially available material, such as those available under the trade name "Ludox". While a variety of silicas with average particle sizes in the range of 10 to 100 nm were tested and found satisfactory, best results were obtained with "Ludox" AS-40 with an average particle size of 22 nm. The spray dried final product should contain at least 25% by weight of this colloidal material for adequate catalyst strength. The amount should not exceed 50% by weight so as not to reduce catalyst concentration unnecessarily. The preferred amount is from 30 to 35% by weight.

The spray drying and calcining steps (b) and (c) are known to those skilled in the art, and can be carried out similarly to the disclosure in U.S. Pat. No. 4,677,084.

The results with this new composition, when tested with a reduced catalyst, showed a surprising degree of improvement compared to the Bergna patent catalyst or to commercial catalysts prepared by the traditional impregnation technology. In the examples below, the catalyst active ingredients were a mixture of vanadium pentoxide and sodium metavanadate in 10 to 1 ratio by weight, which was jet micronized to give a mean particle size below 2 microns in diameter. Attrition resistance of each spray dried and calcined catalyst sample was determined in their oxidized and reduced states using an accelerated attrition test carried out by a standardized 24 hour long test procedure in a modified submerged jet attrition mill. Results were reported as milligram attrited (lost) per hour. An attrition rate of no more than 18 mg/hr and preferably less than 12 mg/hr is considered acceptable per our standard.

The following examples are presented to more fully demonstrate and further illustrate various individual aspects and features of the present invention. As such the examples are felt to be non-limiting and are meant to illustrate the invention but are not meant to be limiting in any way.

COMPARATIVE EXAMPLE

This test was carried out using the Bergna patent technology. The micronized catalyst was slurried with freshly prepared polysilicic acid containing 5% by weight silica. The solids concentrations in the slurry was adjusted to produce dried particles containing approximately 10% by weight silica. The slurry was spray dried to produce fluidizable particles with a mean diameter of 50 to 100 microns and then calcined. Attrition rates were tested as described previously.

Example 1

This test was carried out using our inventive process. The catalyst was slurried with freshly prepared polysilicic acid and deionized Ludox AS-40 colloidal silica in a proportion to provide in the spray dried particles about 10% by weight silica from polysilicic acid (for the silica shell) and 35% by weight silica from 22 nm colloidal silica (for the strong skeleton to support the silica shell), with the balance of the weight the catalyst active ingredients. The slurry was then spray dried, calcined and attrition tested as in the Comparative Example.

Example 2

This test of our inventive process was carried out in the same way as Example 1, except that 30% by weight silica was provided by the colloidal silica.

Example 3

This test of our inventive process was carried out in the same way as Example 2, except that the solids content of the slurry was 34.5% by weight rather than 36.4% for Example 2.

TABLE 1

Comparison of Catalyst Samples

| Example No. | Attrition, mg/hr | | Bulk Dens. gm/ml | Surf. Area m²/gm | Pore Vol. ml/gm | Wt % Act. Ingred. |
|---|---|---|---|---|---|---|
| | Oxidized | Reduced | | | | |
| Comp.Ex. | 7 | 258 | 1.16 | 9.5 | 0.050 | 88 |
| Ex. 1 | 5 | 11 | 0.82 | 37.2 | 0.134 | 55 |
| Ex. 2 | 6 | 6 | 1.01 | 20.5 | 0.051 | 60 |
| Ex. 3 | 3 | 6 | 1.04 | 23.3 | 0.105 | 60 |

The Comparative Example prepared by the Bergna patent process gave satisfactory attrition resistance in its oxidized state, but unexpectedly showed as much as 40 times higher attrition rate than the best inventive compositions in its reduced form.

Table 1 clearly shows that the catalysts prepared as in this invention exhibit excellent attrition resistance in both its oxidized and reduced state as well as lower bulk density, higher surface area, and higher pore volume than the Comparative Example catalyst.

A commercial catalyst for naphthalene oxidation which was made by the conventional method of impregnation of vanadia on silica was tested for attrition resistance in a manner similar to the above examples. The attrited material lost during the first 18 hours of the test contained a vanadium content essentially twice that of the starting catalyst indicating that the vanadium oxide catalytically active phase is particularly susceptible to abrasion and loss and is thus selectively subject to attrition. In contrast, catalyst prepared by the process of the instant invention which creates a porous micro-spherical silica shell from polysilicic acid around the vanadia does not experience such selective losses of the vanadium, but instead exhibits vanadium content in the attrited material essentially equivalent to the vanadium content of the starting attrition resistant catalyst composition.

Having thus described and exemplified the invention with a certain degree of particularity, it should be appreciated that the following claims are not to be so limited but are to be afforded a scope commensurate with the wording of each element of the claim and equivalents thereof.

We claim:

1. Process for manufacturing of an attrition resistant catalyst having an oxide-rich surface layer comprising the steps of:

a) forming a slurry comprising:
      i) catalyst or catalyst precursor, wherein the catalyst or catalyst precursor contains one or more transition metal oxide,
      ii) a colloidal oxide sol wherein oxide particles in the sol having an average size between 10 and 100 nm; and
      iii) a solution of a solvent and solute wherein the solute consist essentially of a precursor of said oxide-rich surface with particle size no greater than 5 nm; and wherein 25 to 50% of the total dry catalyst weight is from the colloidal oxide sol (ii), 5% to 15% of the total dry catalyst weight is from the soluble oxide precursor (iii), and the remainder is from the catalyst or catalyst precursor (i);

b) spray drying the slurry from step (a) to form porous microspheres of attrition resistant catalyst; and, c) calcining the spray dried microspheres of step (b) at an elevated temperature which is below the temperature which is substantially deleterious to the catalyst or catalyst precursor.

2. The process of claim 1 wherein said oxide-rich surface layer is $SiO_2$ and the solution of solute is aqueous silicic acid solution equivalent to a weight of $SiO_2$ not exceeding 6 wt %.

3. The process of claim 2 wherein the silicic acid is polysilicic acid.

4. The process of claim 1 wherein the transition metal oxide is vanadium, molybdenum or mixture thereof.

5. The process of claim 1 wherein 30% to 35% of the total dry catalyst weight is from the colloidal oxide sol (ii).

6. The process of claim 1 wherein the catalyst or catalyst precursor particles (i) have a mean particle size below about 3 microns.

* * * * *